United States Patent [19]

Takenaka et al.

[11] 4,426,089
[45] Jan. 17, 1984

[54] DUST-PROOF DEVICE FOR MECHANICAL SEAL

[75] Inventors: Akira Takenaka; Tatsuhiko Fukuoka, both of Toyota, Japan

[73] Assignee: Taiho Kogyo Co., Ltd., Aichi, Japan

[21] Appl. No.: 386,817

[22] Filed: Jun. 9, 1982

Related U.S. Application Data

[63] Continuation of Ser. No. 92,163, Nov. 7, 1979, abandoned.

[30] Foreign Application Priority Data

Nov. 8, 1978 [JP] Japan ................... 53/153654[U]

[51] Int. Cl.³ .............................................. F16J 15/34
[52] U.S. Cl. ...................................... 277/27; 277/53; 277/65
[58] Field of Search ................... 277/68, 69, DIG. 4, 277/53, 69, 27, 65, 81 R

[56] References Cited

U.S. PATENT DOCUMENTS

| | | | |
|---|---|---|---|
| 2,882,075 | 4/1959 | Biering et al. | 277/68 |
| 2,908,536 | 10/1959 | Dickey | 277/25 |
| 2,936,715 | 5/1960 | Southam et al. | 277/53 |
| 3,895,811 | 7/1975 | Richard et al. | 277/65 |
| 4,194,745 | 3/1980 | McDougal | 277/27 |

Primary Examiner—Robert I. Smith
Attorney, Agent, or Firm—Flynn, Thiel, Boutell & Tanis

[57] ABSTRACT

A dust-proof device for preventing dust from entering into sliding surfaces from the inside thereof in a mechanical seal for avoiding the leakage of fluid from the outside into the inside of the sliding surfaces, which mechanical seal comprises a seating ring which receives therethrough a rotary shaft and a follower ring which is rotated together with the rotary shaft in sliding contact with the seating ring. The dust-proof device comprises a dust-proof disk which is attached to the rotary shaft. This disk is opposed to the end face of the seating ring with leaving a small clearance between them and the above end face is the opposite surface relative to the sliding surface of the seating ring. The dust-proof disk is rotated together with the rotary shaft to avoid the entering of dust into the clearance, thereby preventing the dust from entering into the sliding surfaces. Further, it is possible to seal up the clearance by bringing the peripheral portion of the dust-proof disk into contact with the end face of seating ring continuously or temporarily during the stoppage of the rotary shaft.

9 Claims, 3 Drawing Figures

DUST-PROOF DEVICE FOR MECHANICAL SEAL

This is a continuation of application Ser. No. 92 163, filed Nov. 7, 1979 and now abandoned.

BACKGROUND OF THE INVENTION

This invention relates to a dust-proof device for a mechanical seal which prevents a fluid from leakage through rotary shaft portions.

In the mechanical seal of the above-mentioned kind, a seating ring on the stationary side which receives therethrough a rotary shaft is generally brought into slidable contact with a follower ring which is rotated together with the above rotary shaft, thereby avoiding the leakage of fluid from the outside of the sliding contact portion to the inside thereof. In order to enhance the sealing effect of the sliding contact surfaces in the conventional prior art, it is quite important to investigate all the factors, especially the configurations of sliding contact surfaces, of both the rings which constitute the rotating sliding surfaces. Therefore, in connection with both the rings, a variety of proposals have hitherto been made. According to the investigations of the present inventors, the following fact has been found out. That is, in the case that the outside fluid of a mechanical seal is a gas, especially when the outside gas contains much dust like the mechanical seal of the compressor for an automobile cooler, it is quite important to keep off the dust contained in the outside gas from the sliding surfaces as well as to investigate with regard to the above-mentioned rings. In other words, the entering of dust into the space between sliding surfaces apparently reduces the sealing effect of the mechanical seal.

BRIEF SUMMARY OF THE INVENTION

It is, therefore, the object of the present invention to prevent the dust in the outside gas from entering into the sliding surfaces between the seating ring and follower ring. In order to attain this purpose, a dust-proof disk that is attached to the rotary shaft is disposed in front of the end face of the seating ring with leaving a minute space therebetween. The above end face is the one which is opposite to the sliding surface of the seating ring that receives the rotary shaft therethrough. Accordingly, the present invention is characterized in that the entering of dust into the sliding portion is avoided by the provision of the dust-proof disk and its rotational action.

Another object of the present invention is to enhance the dust-proof effect by sealing with bringing the peripheral portion of the dust-proof disk into contact with the end face of seating ring temporarily or continuously during the stoppage of the rotary shaft.

BRIEF DESCRIPTION OF THE DRAWINGS

These and other objects and features of the invention will become more apparent from the following description taken in connection with the accompanying drawings in which.

DESCRIPTION OF PREFERRED EMBODIMENTS

Referring now to the accompanying drawings, some embodiments of the dust-proof devices of mechanical seals according to the present invention will be described in detail.

Figure 1:
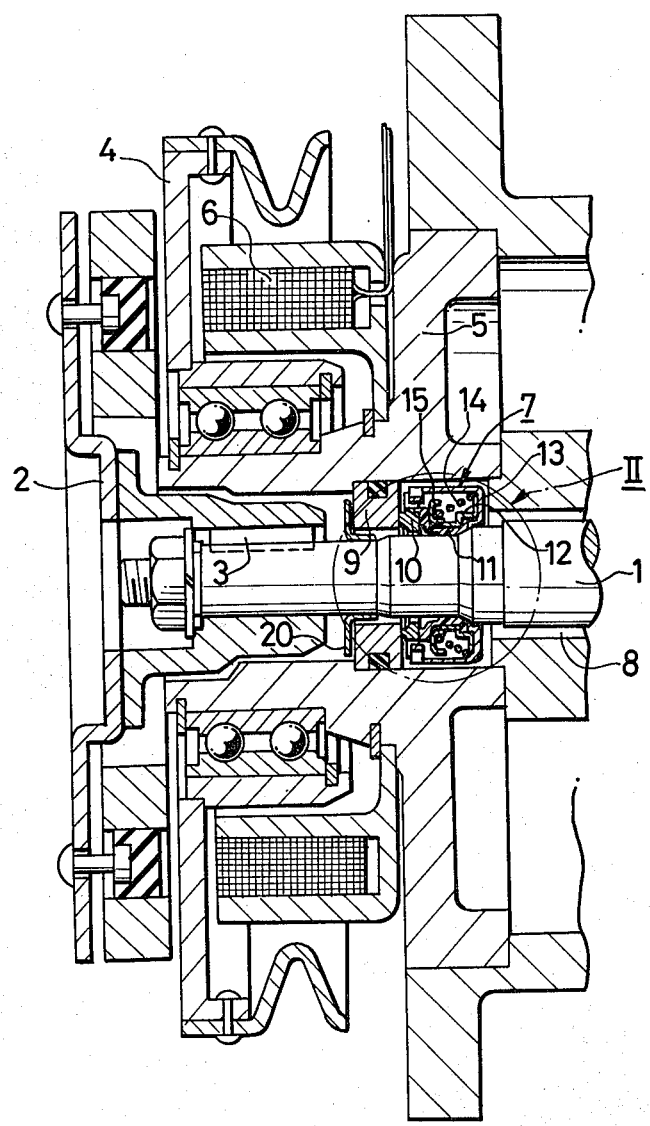
FIG. 1 is a vertical cross-sectional view of a mechanical seal which is provided with the dust-proof device of the present invention.

As an example of a mechanical seal having a dust-proof device, a part of a compressor for an automobile cooler is shown in FIG. 1. The rotary shaft of the compressor is provided with a connecting member 2 of an electro-magnetic clutch, which member 2 is axially slidably fitted to the rotary shaft 1 with using a key 3. The rotating member 4 can be rotated relative to the casing 5. Excitation coils 6 are disposed inside the rotating member 4 and when the coils 6 are energized, the rotating member 4 is united with the connecting member 2 so that the rotary shaft 1 is rotated together with the rotating member 4. Further, the mechanical sealing section 7 prevents the leakage of the fluid in the compressor section 8 along rotary shaft 1. A follower ring 10 is slidably engaged with a seating ring 9 which is fitted around the rotary shaft 1. The follower ring 10 is rotated together with the rotary shaft 1 and the leakage of oil or gas through the gap between the rotary shaft 1 and the seating ring 9 can be avoided by the above slidable engagement of the follower ring 10. The packing 11 is closely fitted to the rotary shaft 1 by means of the keep plate 12 and a knock ring 13. The follower ring 10 is urged toward the seating ring 9 by the force of a helical spring 14 which is retained by a spring retainer 15.

In the above-described mechanical seal, a pressurized fluid consisting of a gas and a liquid is sealed in on the outside of the rotary sealing surface, that is, on the inside of the compressor. The sealed pressurized fluid is prevented from leakage from the outside of the rotary sealing surface to the inside air, that is, the outside of the compressor.

Figure 2:
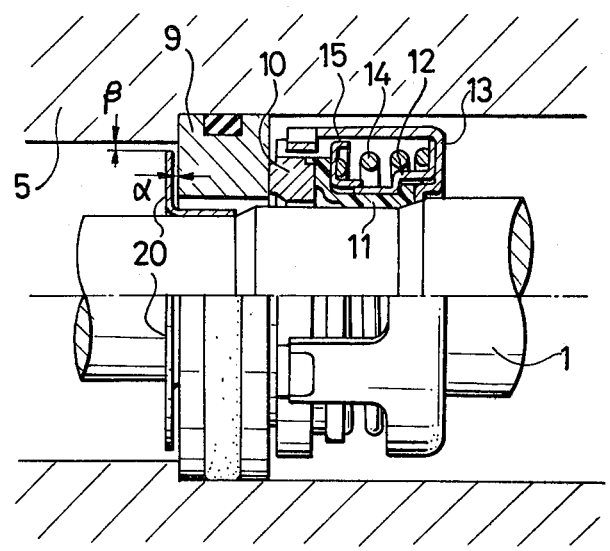
FIG. 2 is an enlarged partial cross-sectional view of the portion II in FIG. 1.

Meanwhile, in accordance with the present invention, a dust-proof disk 20 is attached to the rotary shaft 1 in the above-described mechanical seal as shown by the enlarged drawing of FIG. 2. This dust-proof disk 20 has an annular surface that is opposed to the outside end face of the seating ring 9 and is laterally spaced a small distance from the end face. Disk 20 is disposed on the opposite side relative to the sliding surface of the seating ring, which surface is brought into contact with the sliding surface of the follower ring 10. The clearance $\alpha$ between the dust-proof disk 20 and the end face of the seating ring 9 may be so determined as to prevent dust from entering through the above clearance.

When the rotary shaft 1 is rotated in the mechanical seal having the above-described structure, the dust-proof disk 20 is rotated together with the rotary shaft 1. During the rotation of this dust-proof disk 20, it is considered that the gas existing in the space between the dust-proof disk 20 and the seating ring 9 receives the force which is oriented outward from the center of rotation. Accordingly, the gas currents in the same direction are caused to occur and thereby attaining the dust preventive effect with these gas currents. The above-mentioned clearance $\alpha$ is, therefore, determined adequately so as to obtain such the effect. The value of clearance $\alpha$ is varied in accordance with several factors such as the rotational speed of the rotary shaft 1 and the diameter of the dust-proof disk 20. More particularly, in the case of a compressor for an automobile cooler, the above clearance α may be set to the range of about 0.3 to 3.0 mm to obtain preferable effect.

Furthermore, it is possible to form the dust-proof disk 20 by using a flexible material which can be deformed by slight force and to allow at least an outer peripheral portion of the dust-proof disk 20 to contact closely with the end face of seating ring 9. That is, a negative pressure arises in the vicinity of these rotating members due to their rotation so that, when the rotation is stopped, the outside gas flows into such the negative pressure part. Therefore, the dust-proof disk 20 is brought into contact with the seating ring 9 owing to the above flow of outside gas and the pressure difference between both surfaces of the dust-proof disk 20. Accordingly, when the material for making the dust-proof disk 20 is selected so as to obtain the above function, the dust preventive effect can be much enhanced.

Figure 3:
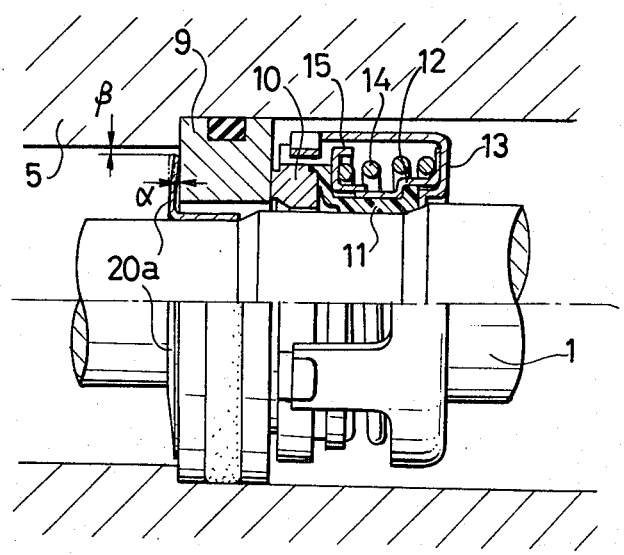
FIG. 3 is also an enlarged partial cross-sectional view of the portion like FIG. 2, in connection with another embodiment of the present invention.

When the dust-proof disk 20a is so made as to come into contact with the seating ring 9 by its own elasticity during the stoppage of rotation as shown by the solid lines in FIG. 3 and to leave from the seating ring 9 by the centrifugal force during the rotation of the rotary shaft 1 as shown by the imaginary lines in the same figure, the same effect can be obtained.

The clearance β in the radial direction between the free outer peripheral edge of the dust-proof disk 20 and the casing 5 may be so determined that the above-mentioned gas currents are not impeded. More particularly, the value of clearance β may be in the range of about 0.5 to 5.0 mm. Further, it is possible to form grooves in order to expedite the above-mentioned gas currents.

Although the present invention has been described in connection with the preferred embodiments thereof, many variations and modifications will now become apparent to those skilled in the art. It is preferred, therefore, that the present invention be limited not by the specific disclosure herein but only by the appended claims.

What is claimed is:

1. In a mechanical seal including a seating ring which receives therethrough a rotary shaft and forms a stationary member and a follower ring which is rotated together with said rotary shaft in sliding contact with said seating ring, said seating ring having a substantially radially extending end face facing axially away from said follower ring and a sliding surface in said sliding contact with said follower ring, said seating ring being supported in a shaft passage in a casing, and an annular member attached at its central opening to and extending in a direction outwardly from said rotary shaft oppositely to the end face of said seating ring, the improvement being comprised by:

said annular member comprising means for avoiding entry of dust from outside air into the area of sliding contact between said rings, both during rotation and absent rotation, said means being an annular dustproof disk consisting of an axial sleevelike part fixed on said shaft and an annular radial platelike part fixed at its inner edge to said axial part, said axial sleevelike part being loosely surrounded for most of its axial length by said stationary seating ring with one end thereof extending axially just beyond said end face of said seating ring to support said radial platelike part, said disk being flexible and of substantially constant thickness and L-shaped cross-section, said platelike part being of bend-free, substantially linear cross-section extending outward substantially radially from said axial part to a substantially radially outward facing free outer peripheral edge engageable with said seating ring end face in the nonrotating condition of said shaft to impede dirt inflow to said sliding contact area, the axial extent of said outer peripheral edge corresponding to the material thickness of said platelike part, said platelike part having axially oppositely facing inner and outer annular side surfaces, said annular inner side surface being smooth and spaced from said seating ring end face across an axial clearance space, during rotation of the shaft, of small thickness impeding dirt inflow to the sliding contact area but not gas outflow therefrom and of length corresponding to the radial extent of overlap of said seating ring by said annular disk, said free outer peripheral edge being spaced from the inside wall of said shaft passage across a further clearance space of thickness similar to that of said axial clearance and of length corresponding to said material thickness of said platelike part, said further clearance space being at the radially outer edge of said axial clearance space and forming a continuation thereof, said annular disk thereby forming during rotation a substantially L-cross-section clearance extending radially outward along said seating ring end face and then bending axially away from said end face, means sealing said follower ring to said shaft and, cooperatively therewith and with said seating ring, forming a small closed annular cavity substantially sealed to outside gas except for communication with the radially inner end of said clearance space.

2. The improvement as defined in claim 1, wherein said axial clearance between the annular side surface of said dust-proof disk and the end face of the seating ring is in the range of about 0.3 to 3.0 mm, and the further clearance between the free outer peripheral edge of said dust-proof disk and the inside wall of the shaft passage is in the range of about 0.5 to 5.0 mm.

3. The improvement as defined in claim 1, wherein the flexibility of the dustproof disk causes an outer peripheral portion of the annular surface to come into contact with the end face of the seating ring under the influence of a pressure difference formed at both sides of the disk.

4. The improvement as defined in claim 1, in which said casing is an automobile cooler compressor casing and including a pressurized fluid consisting of a gas and a liquid sealed in radially outside of said follower ring and thereby in the interior of said compressor casing, the radially inside of said follower ring communicating with the exterior of said compressor casing and thereby connected to the outside air past said annular member.

5. The improvement as defined in claim 1, in which a pressurized fluid is sealed in radially outside of said follower ring and the radially inside thereof is connected to outside gas, said disk is flexible, said disk being effective to bend by its own elasticity and bring at least an outer peripheral portion of its inner annular surface into contact with the opposed end face of said seating ring to seal up such outer peripheral portion, said disk during rotation of said rotary shaft being separated from said opposed end face of the seating ring by centrifugal force against its own elasticity to form said axial clearance between said inner annular surface of said disk and the opposed end face of said seating ring.

6. In a mechanical seal including a seating ring which received therethrough a rotary shaft and forms a stationary member and a follower ring which is rotated with said rotary shaft in sliding contact with said seating ring which has an end face and is supported in a casing and, in said mechanical seal, a pressurized fluid is sealed in on the outside of said follower ring and the inside thereof is connected to outside gas, the improvement comprising:
- a flexible dust-proof disk snugly surrounding said rotary shaft,
- said dust-proof disk being positioned on a plane extending in the direction of the radius of said rotary shaft,
- said dust-proof disk having a free outer peripheral edge portion and axially oppositely facing annular surfaces,
- the outer said annular surface facing outside gas and the inner said annular surface being opposed to and axially spaced from the end face of said seating ring to form a minute clearance therebetween,
- means sealing said follower ring to said shaft and, cooperatively therewith and with said seating ring, forming a small closed annular cavity substantially sealed to outside gas except for communication with the radially inner end of said minute clearance,
- means fixing said disk to said shaft for removing gas from said small annular cavity and therewith producing a negative pressure in said minute clearance in response to rotation of said shaft and disk, the resulting pressure difference across said disk resulting in a tendency for outside gas to try to flow into said cavity when rotation stops,
- said dust-proof disk being flexible sufficient to bend, in response to said negative pressure and gas flow tendency, said outer peripheral edge portion into sealing contact with the end face of said seating ring, during stoppage of rotation.

7. The improvement as defined in claim 6, wherein said end face is on the opposite side of the seating ring with respect to the sliding surface of the seating ring.

8. The improvement as defined in claim 6, wherein said seating ring end face extends substantially radially and faces axially away from said follower ring, said seating ring being supported in a shaft passage in the casing, said disk having an axial part on said shaft and an annular platelike part fixed at its inner edge to said axial part, said platelike part being of bend-free, substantially linear cross-section extending outward substantially radially from said axial part, said free outer peripheral edge being substantially radially outward facing, the axial extent of said outer peripheral edge corresponding to the material thickness of said platelike part, said platelike part having said axially oppositely facing inner and outer surfaces, said clearance space being an axial clearance space and during rotation of the shaft being narrow in thickness for impeding dirt inflow but not gas outflow and of length corresponding to the radial extent of overlap of said seating ring by said annular disk, said free outer peripheral edge being spaced from the inside wall of said shaft passage across a further clearance space of thickness similar to that of said axial clearance and of length corresponding to said material thickness of said platelike part, said further clearance space being at the radially outer edge of said axial clearance space and forming a continuation thereof, said disk thereby forming during rotation a substantially L-cross-section clearance extending radially outward along said seating ring end face and then bending axially away from said end face.

9. The improvement as defined in claim 8, wherein said axial clearance between the annular side surface of said dust-proof disk and the end face of the seating ring is in the range of about 0.3 to 3.0 mm, and the further clearance between the free outer peripheral edge of said dust-proof disk and the inside wall of the shaft passage is in the range of about 0.5 to 5.0 mm.

* * * * *

UNITED STATES PATENT AND TRADEMARK OFFICE
CERTIFICATE OF CORRECTION

PATENT NO. : 4 426 089

DATED : January 17, 1984

INVENTOR(S) : Akira TAKENAKA et al

It is certified that error appears in the above-identified patent and that said Letters Patent is hereby corrected as shown below:

Column 4, line 36; after "clearance" insert ---space---.

Signed and Sealed this

Tenth Day of July 1984

[SEAL]

Attest:

GERALD J. MOSSINGHOFF

Attesting Officer　　Commissioner of Patents and Trademarks